(12) United States Patent
Horita et al.

(10) Patent No.: US 6,327,404 B1
(45) Date of Patent: Dec. 4, 2001

(54) WAVELENGTH FILTER

(75) Inventors: Masayoshi Horita; Shinsuke Tanaka; Yuichi Matsushima, all of Kamifukuoka (JP)

(73) Assignees: KDD Corporation; Submarine Cable Systems, Inc., both of Tokyo (JP)

( * ) Notice: Subject to any disclaimer, the term of this patent is extended or adjusted under 35 U.S.C. 154(b) by 0 days.

(21) Appl. No.: 09/360,616

(22) Filed: Jul. 26, 1999

(30) Foreign Application Priority Data

Aug. 12, 1998 (JP) .................................................. 10-227731

(51) Int. Cl.$^7$ ...................................................... G02B 6/34
(52) U.S. Cl. ............................. 385/37; 385/131; 385/132
(58) Field of Search ............................... 385/37, 14, 131, 385/132

(56) References Cited

U.S. PATENT DOCUMENTS

Re. 37,051 * 2/2001 Welch et al. .
6,047,096 * 4/2000 Augustson .

* cited by examiner

Primary Examiner—Hung N. Ngo
(74) Attorney, Agent, or Firm—Christie, Parker & Hale, LLP (57) ABSTRACT

A diffraction grating is disposed adjacent to a ridge waveguide formed on a substrate (cladding). Assumed that a light propagation direction at the waveguide is z, a direction of width of the waveguide is x, and ends of the diffraction grating of this embodiment is $x=g_{min}$ when $z=0$ and $x=g_{max}$ when $z=L/2$, the ends of the diffraction grating can be expressed as the following functions f(z). Namely, $$f(Z)=g_{min}+(g_{max}-g_{min})\times(2z/L)^n \text{ when } 0 \leq z \leq L/2,$$

and $$f(Z)=g_{min}+(g_{max}-g_{min})\times(2-2z/L)^n \text{ when } L/2 \leq z \leq L, \text{ where } n>1.$$

10 Claims, 11 Drawing Sheets

PRIOR ART

Fig. 11(c)

PRIOR ART

Fig. 11(b)

PRIOR ART

PRIOR ART

Fig. 14(c)

PRIOR ART

Fig. 14(b)

PRIOR ART

Fig. 15

WAVELENGTH FILTER

FIELD OF THE INVENTION

This invention relates to a wavelength filter, and more specifically, to a wavelength filter for selectively extracting a specific wavelength.

BACKGROUND OF THE INVENTION

Figure 11A:
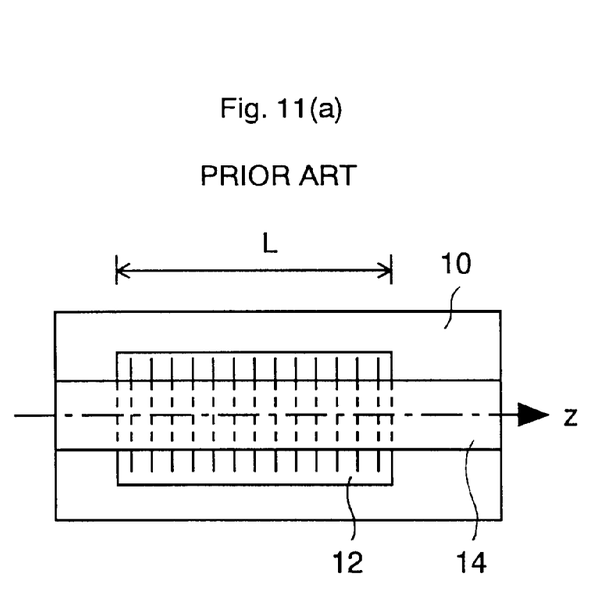
FIG. 11(a) shows a plan view of a conventional configuration.
Figure 11B:
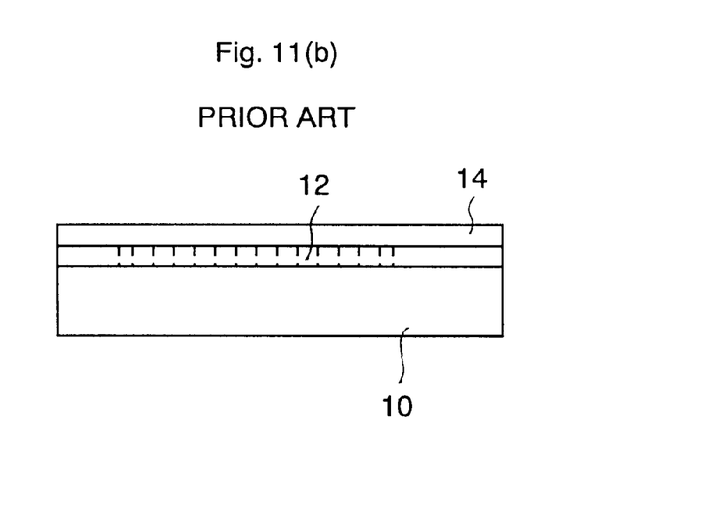
FIG. 11(b) shows a front view of a conventional configuration.
Figure 11C:
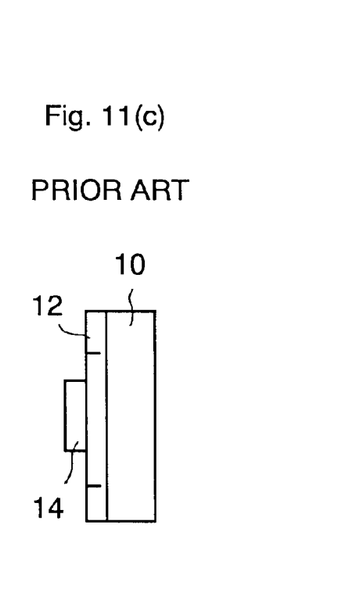
FIG. 11(c) shows a right side view of a conventional configuration.

A wavelength filter for extracting a specific wavelength can be realized for example using wavelength selectivity of diffraction gratings with various forms. FIGS. 11(a)~11(c) show a conventional configuration in which a diffraction grating is formed and disposed to be adjacent to a waveguide and also its effective width (referred as coupling width hereinafter) to be constant in the light propagation direction z. FIG. 11(a), FIG. 11(b) and FIG. 11(c) respectively show its plan view, front view, and right side view. A plane diffraction grating 12 as shown in FIG. 11(a) is formed on a substrate 10, and then a waveguide 14 is formed on it. It is widely known that a cladding layer is sometimes formed on the side of the waveguide 14. The width of the diffraction grating 12 is constant for the distance L of the light propagation direction z.

The diffraction grating 12 can be easily formed using conventional semiconductor crystal growth technology. For instance, after forming a film with a predetermined thickness on the substrate 10, a periodic corrugation should be made using etching. Then the diffraction grating 12 is formed by crystal-growing material having different refractivity on the corrugation. There are several configurations for realizing the waveguide 14 itself. The waveguide 14 is logically illustrated in FIGS. 11(a)~11(c). The diffraction grating 12 is sometimes formed on the waveguide 14.

Figure 12:
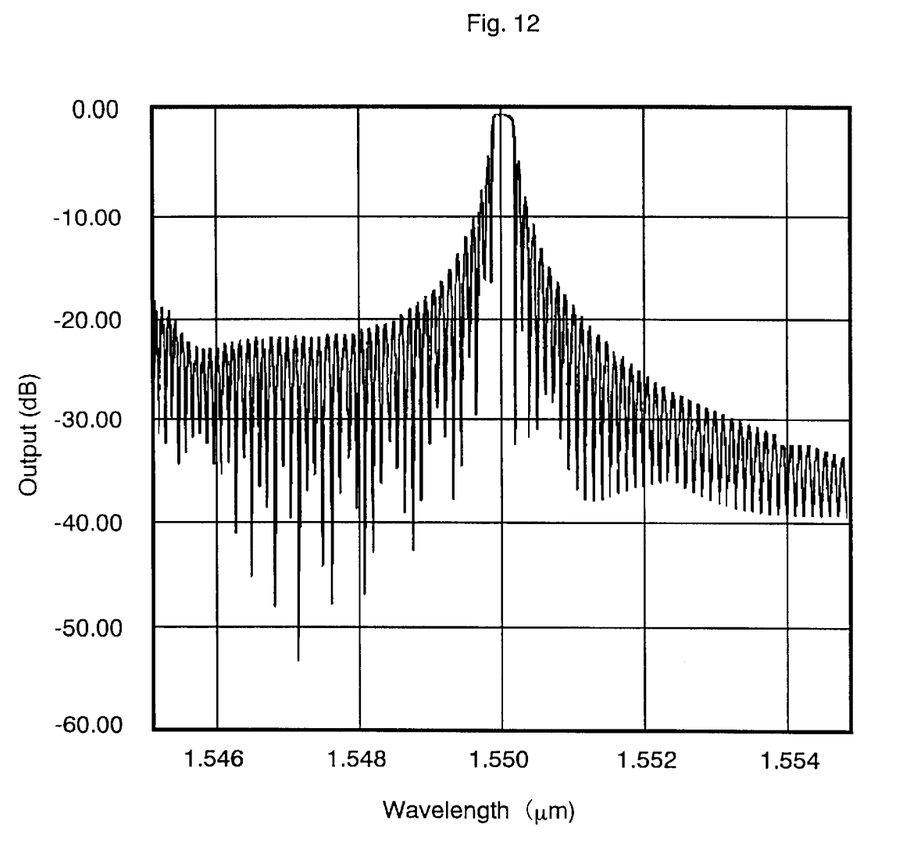
FIG. 12 shows wavelength selectivity of the conventional configuration shown in FIG. 11.
Figure 13:
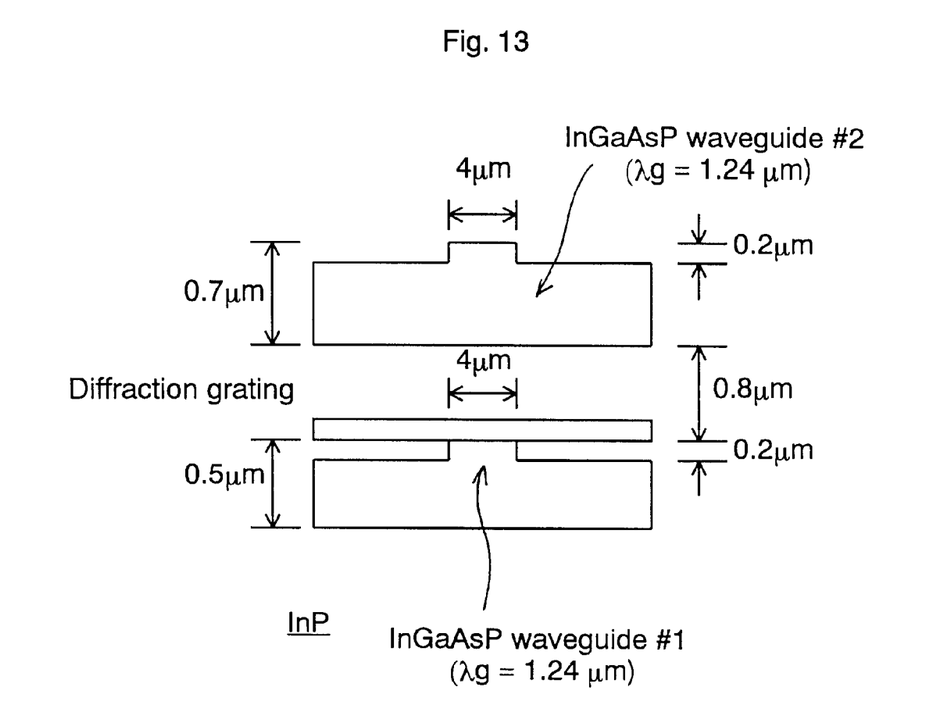
FIG. 13 shows a waveguide parameter employed for the simulation of the conventional art and the embodiment according to the invention.

FIG. 12 shows wavelength selective characteristics of a wavelength filter employing a diffraction grating with a constant coupling width as shown in FIGS. 11(a)~11(c). The abscissa axis shows wavelengths, and the ordinate axis shows output intensity. A central wavelength is 1.55 μm. It is simulated for the structure that InGaAsP waveguides #1 and #2 (their band gap wavelength λg =1.24 μm) respectively having a rib with a width of 4 μm and a height of 0.2 μm are formed 0.8 μm apart from each other and a diffraction grating is disposed between the waveguides #1 and #2 as shown in FIG. 13. The length L of the diffraction grating is preset to 3 mm. The InGaAsP waveguides #1, #2 and the diffraction grating are imbedded in InP. FIG. 13 shows the structure in the surface orthogonal to the light propagation direction. FIG. 12 shows an output optical spectrum when backward coupling between the waveguides #1 and #2 is employed. It is clear from FIG. 12 that, in a conventional configuration in which the coupling width of the diffraction grating is constant in the light propagation direction, the wavelength selectivity is insufficient and the side mode is not effectively suppressed.

Figures 14A, 14C:
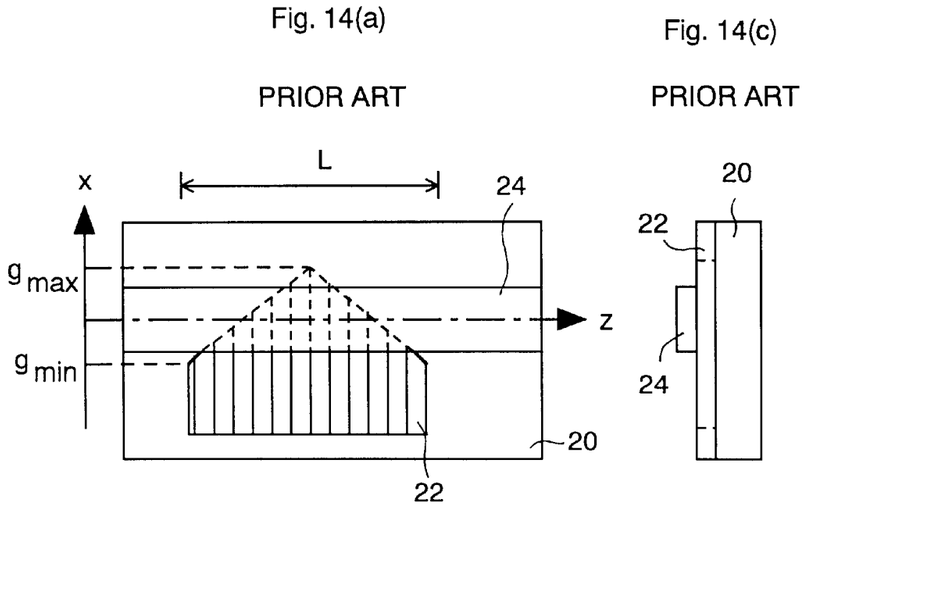
FIG. 14(a) shows a plan view of another conventional configuration.
FIG. 14(c) shows a right side view of the another conventional configuration.

FIGS. 14(a) 14(c) show a conventional configuration in which a coupling width of a diffraction grating linearly widens and narrows in the light propagation direction z. Similarly to FIGS. 11(a)~11(c), FIG. 14(a), FIG. 14(b) and FIG. 14(c) respectively show its plan view, front view, and right side view. In this conventional configuration, also, a plane diffraction grating 22 shown in FIG. 14(a) is formed on a substrate 20, and then a waveguide 24 is formed on it. It is widely known that a cladding layer is sometimes formed on the side of the waveguide 24.

The coupling way of the diffraction grating 22 with the waveguide 24, namely the coupling width of the diffraction grating 22 varies in the light propagation direction. That insufficient.

Outputs of the conventional wavelength filters still contain many unnecessary components of other wavelength bands besides a selected wavelength, therefore the improvement of the wavelength filter has been expected.

SUMMARY OF THE INVENTION

An object of the invention is to provide a wavelength filter capable of greatly suppressing unnecessary components.

A wavelength filter according to the invention comprises a waveguide and a diffraction grating disposed adjacent to the waveguide which coupling width with the waveguide widens at a central part and narrows at both ends in a predetermined coupling area along the light propagation direction of the waveguide, and the wavelength filter is characterized in that the variation of the coupling width of the diffraction grating along the light propagation direction of the waveguide is large at the central part and decreases as approaching to both ends in the coupling area. Because of the above characteristics, the function for suppressing components of other wavelength bands excluding a specified wavelength becomes powerful and also the side mode characteristics improves. is, in the first half of the distance L in the light propagation direction z, the diffraction g rating 22 is gradually superimposed on the waveguide 24 along the light propagation direction z, and in the latter half, the diffraction grating 22 in reverse gradually separates from the waveguide 24 along the light propagation direction z. The variation of the coupling way of the diffraction grating 22 with the waveguide 24, namely the variation of the ends of the diffraction grating 22 in the light propagation direction z is linear on both first and latter halves of the distance L.

Figure 14B:
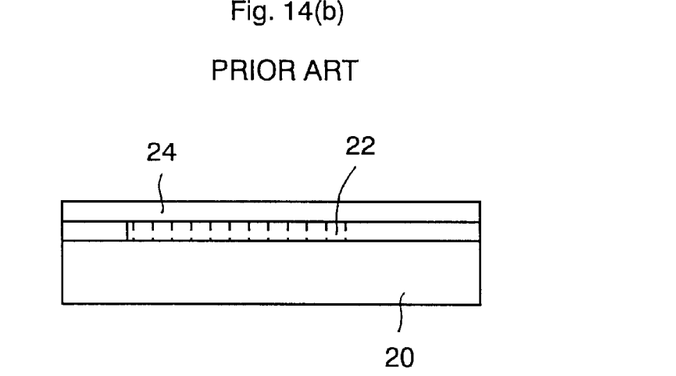
FIG. 14(b) shows a front view of the another conventional configuration.
Figure 15:
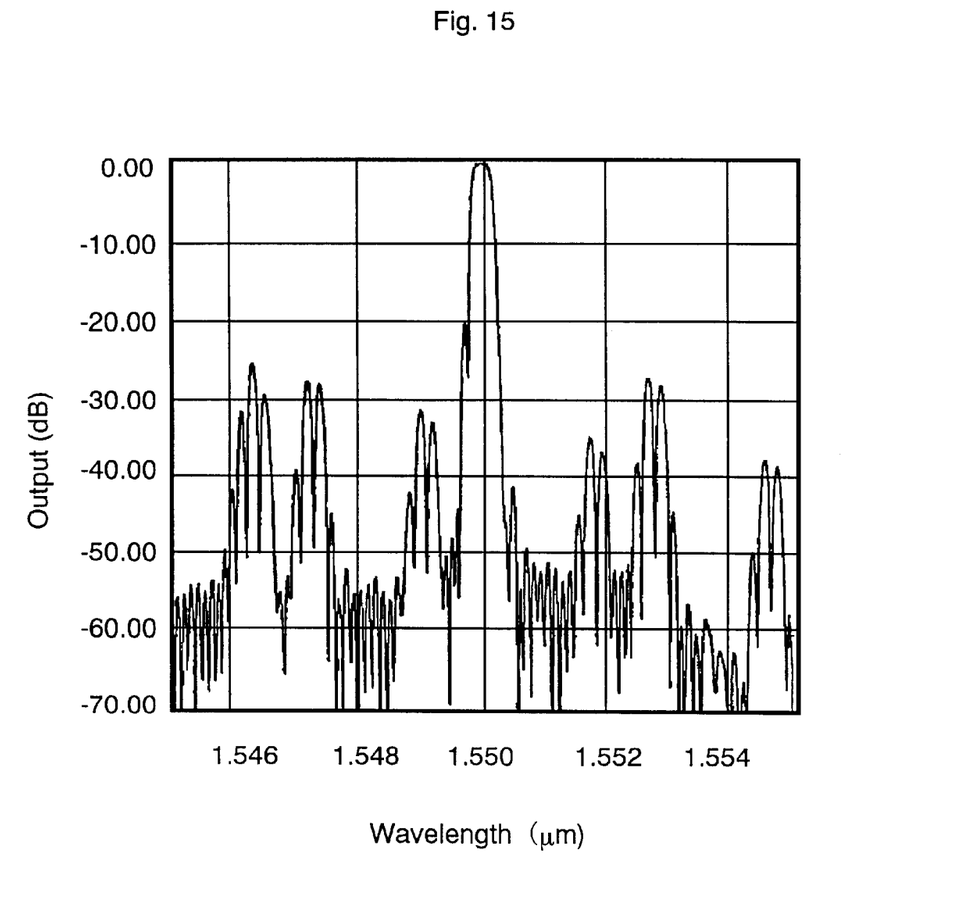
FIG. 15 shows wavelength selectivity of the conventional art shown in FIGS. 14(a)~14(c).

FIG. 15 shows wavelength selectivity of a wavelength filter in which a coupling width of a diffraction grating linearly widens in the first half and narrows in the latter half as shown in FIG. 14. The abscissa axis shows wavelengths, and the ordinate axis shows output intensity. A central wavelength is 1.55 μm. Similarly to the conventional configuration in FIGS. 11(a)~11(c), it is simulated for a waveguide configuration which comprises the waveguide parameters shown in FIG. 13. Similarly to FIG. 12, FIG. 15 shows an output optical spectrum on condition that the backward coupling of the waveguides #1 and #2 is employed. Although the side mode characteristics are improved compared to the case in FIG. 12, it is still For instance, the coupling width of the diffraction grating is set to vary at the n (n>1) power of the distance of the light propagation direction and become the largest at the central part of the coupling area.

The diffraction grating also can be disposed to stretch from one direction on the side of the waveguide to cover the waveguide. The diffraction grating may be a rhombus with its respective sides are incurved and disposed so that at least two vertexes of the rhombus are superimposed on the waveguide. The former configuration is easier to produce.

Furthermore, a second waveguide can be disposed adjacent to the forgoing waveguide. Accordingly, the invention can be applied to a wavelength selective filter due to coupling between two waveguides.

DESCRIPTION OF THE PREFERRED EMBODIMENTS

Embodiments of the invention will be explained below in detail with reference to the drawings.

Figure 1A:
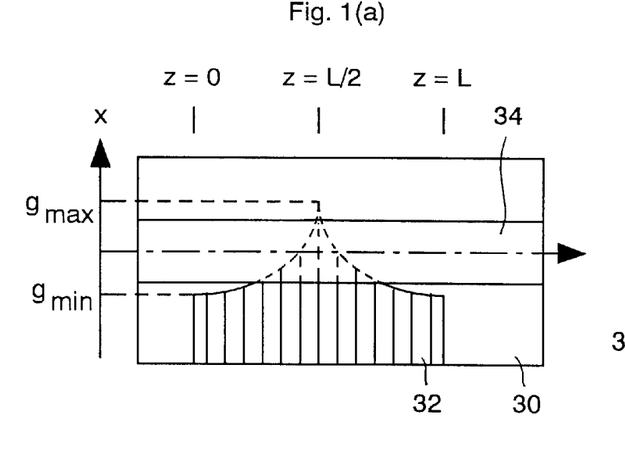
FIG. 1(a) shows a plan view of a configuration of an embodiment according to the invention.
Figure 1B:
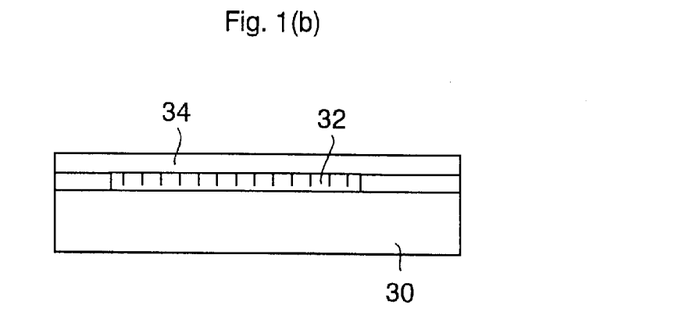
FIG. 1(b) shows a front view of the configuration of the embodiment according to the invention.
Figure 1C:
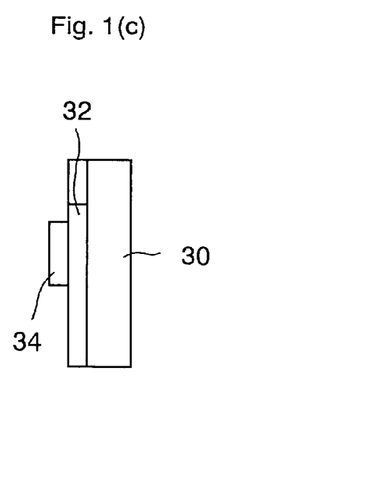
FIG. 1(c) shows a right side view of the configuration of the embodiment according to the invention.

FIGS. 1(a)~1(c) show a configuration of an embodiment according to the invention. FIG. 1(a), FIG. 1(b) and FIG. 1(c) respectively show its plan view, front view and right side view. A plane diffraction grating 32 as s shown in FIG. 1(a) is formed on a substrate 30, and then a waveguide 34 is formed on it. It is widely known that a cladding layer is sometimes formed on the side of the waveguide 34. The diffraction grating 32, similarly to the conventional diffraction gratings 12 and 22, can be formed using conventional semiconductor crystal growth technology. Also, similarly to the waveguides 14 and 24, there are many configurations for realizing the waveguide 34 itself. The waveguide 34 is logically illustrated here. The diffraction grating 32 sometimes formed on the waveguide 34.

In the embodiment, as clearly shown in FIG. 1(a), the way of coupling of the diffraction grating 32 with the waveguide 34, namely its coupling width varies in the light propagation direction. That is, in the first half of the distance L of the light propagation direction z, the diffraction grating 32 is superimposed on the waveguide 34 more quickly than linear along the light propagation direction z, and in the latter half, in reverse, the diffraction grating 32 separates from the waveguide 34 more quickly than linear along the light propagation direction z.

As described above, the variation of the coupling width of the diffraction grating 32 in relation to the waveguide 34 is more abrupt than a conventional configuration shown in FIGS. 14(a)~14(c). To put it concretely, an end of the diffraction grating 32 changes at the n (n>1) power of the light propagation direction z. As shown in FIG. 1(a), assumed that the end of the diffraction grating 34 is $x=g_{min}$ when z=0 and $x=g_{max}$ when z=L/2, the end of the diffraction grating 34 can be expressed as the following functions f(z). That is, $f(z)=g_{min}+(g_{max}-g_{min})\times(2z/L)^n$ when $0\leq z\leq L/2$, and $f(z)=g_{min}+(g_{max}-g_{min})\times(2-2z/L)^n$ when $L/\leq z\leq L$, where n>1, however preferably n should be equal to or less than about four to be practical.

Figure 2:
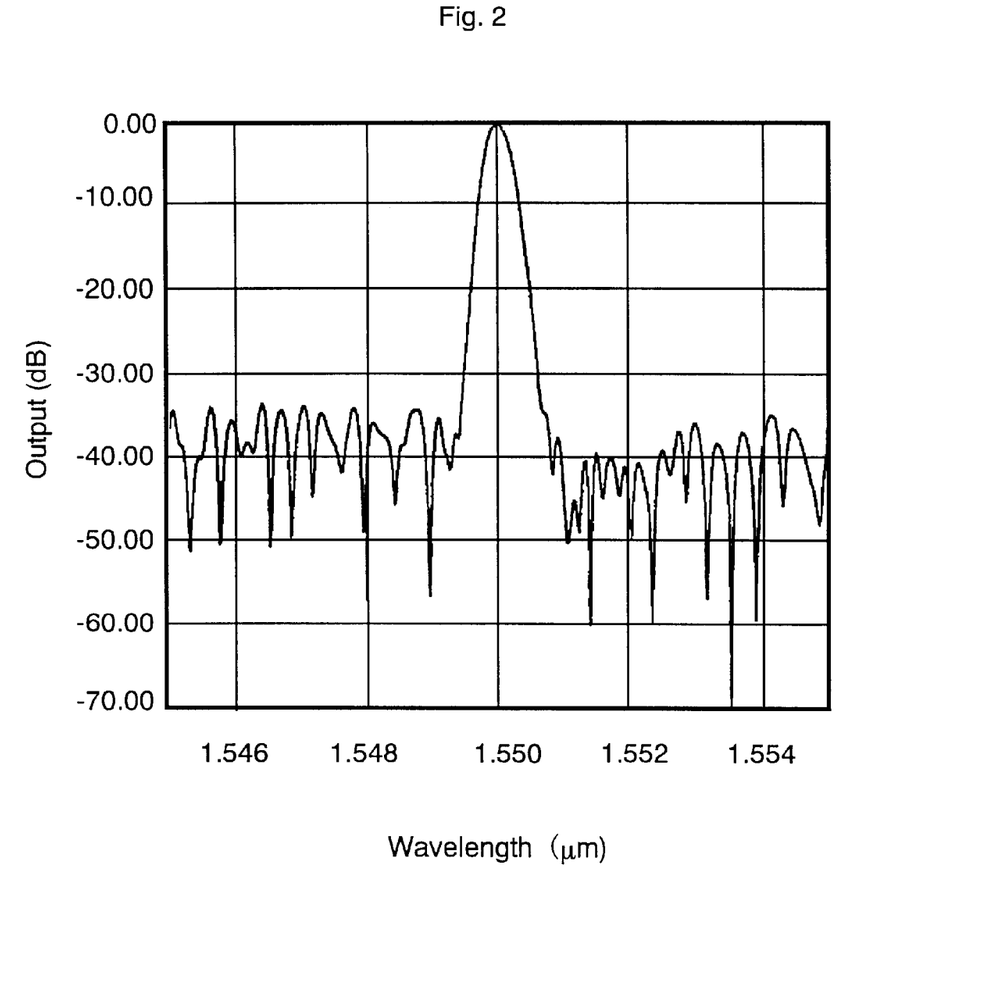
FIG. 2 shows a characteristic diagram (n=3) of the embodiment.

The wavelength selectivity is simulated under the same waveguide parameters (namely, the waveguide parameters shown in FIG. 13) as the conventional functions except the variation of the coupling width of the diffraction grating 32. FIG. 2, similarly to FIGS. 12 and 15, shows an output optical spectrum when the backward coupling between the waveguides #1 and #2 is employed. Hereupon, n is equal to 3. Compared FIG. 2 with FIGS. 12 and 15, it is clear that the extremely outstanding wavelength selectivity can be obtained in this embodiment. In particular, since the side mode can be strongly suppressed, it becomes possible to effectively reduce unnecessary wavelength components, or crosstalk.

Figure 3:
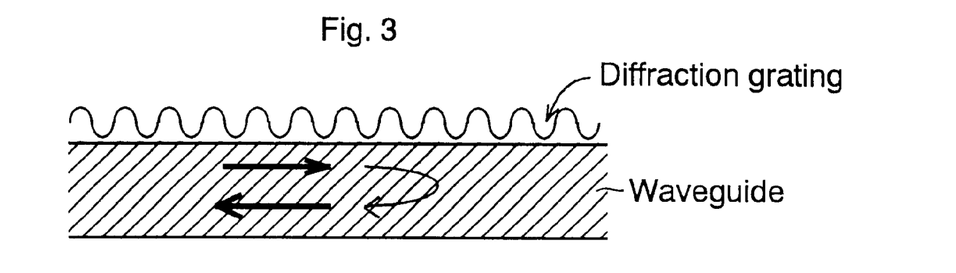
FIG. 3 shows coupling in the inverse direction in the same waveguide.
Figure 4:
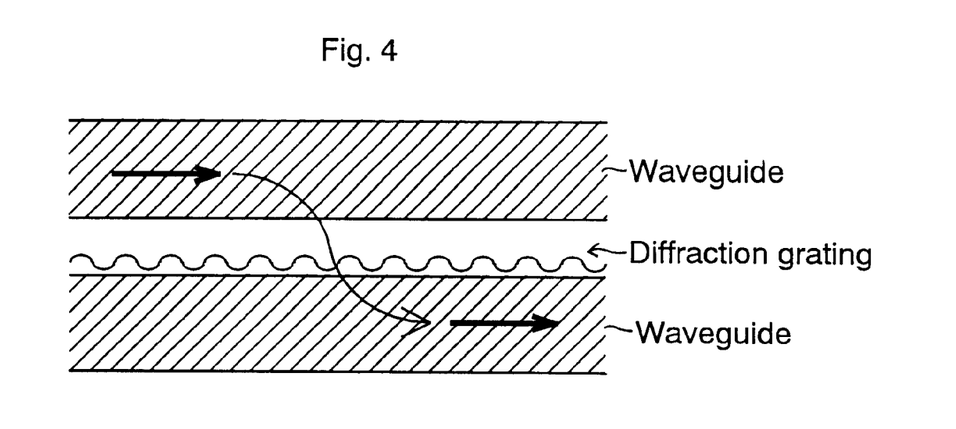
FIG. 4 shows coupling in the same direction between two waveguides.
Figure 5:
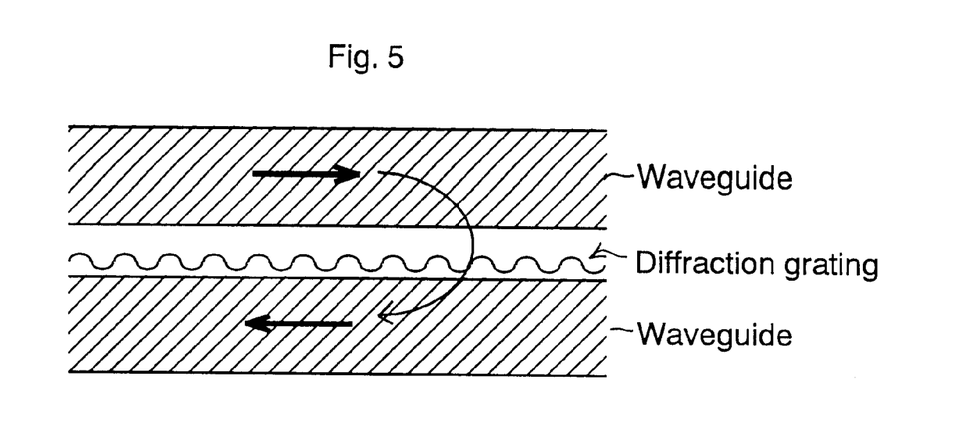
FIG. 5 shows coupling in the inverse direction between the two waveguides.

Examples of optical coupling of the embodiment are shown in FIGS. 3, 4 and 5. FIG. 3 shows coupling in the inverse direction in the same waveguide, FIG. 4 shows coupling in the same direction between the two waveguides and FIG. 5 shows coupling in the inverse direction between the two waveguides. This invention is applicable to any one of the above coupling configurations.

Figure 6:
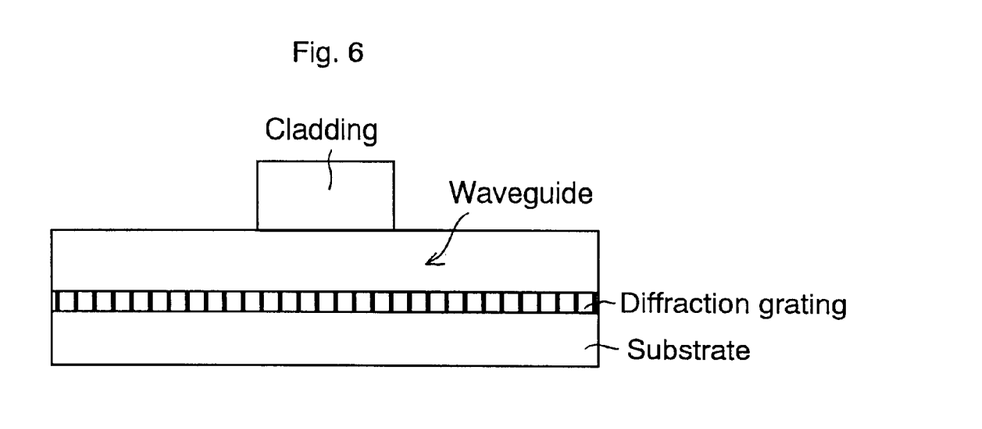
FIG. 6 shows a sectional configuration disposing a diffraction grating under a ridge waveguide.
Figure 7:
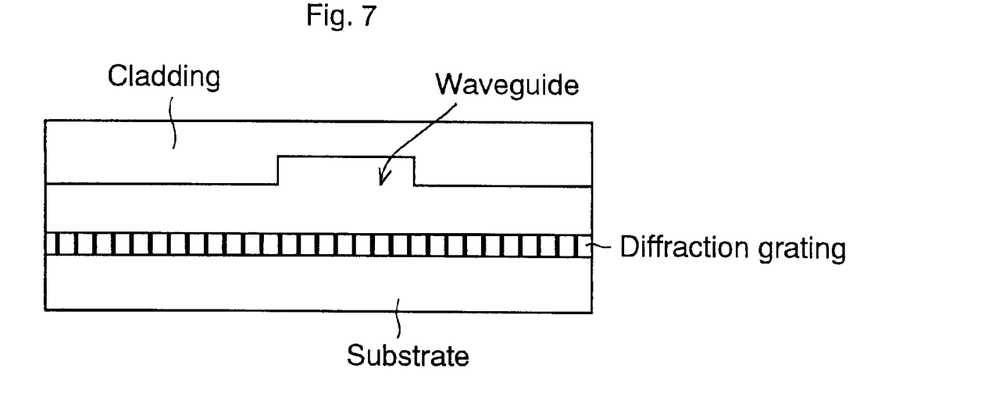
FIG. 7 shows a sectional configuration disposing a diffraction grating under a rib waveguide.
Figure 8:
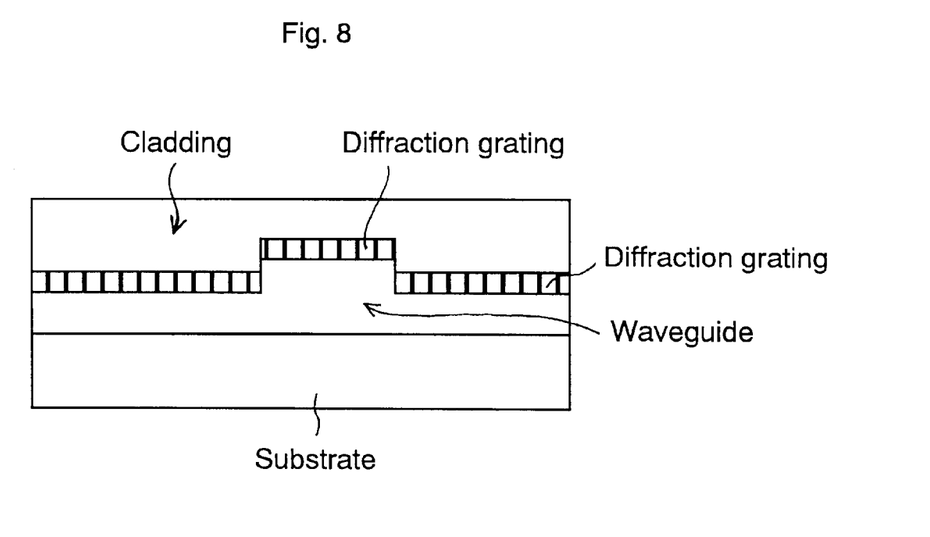
FIG. 8 shows a sectional configuration disposing a diffraction grating on a rib waveguide.
Figure 9:
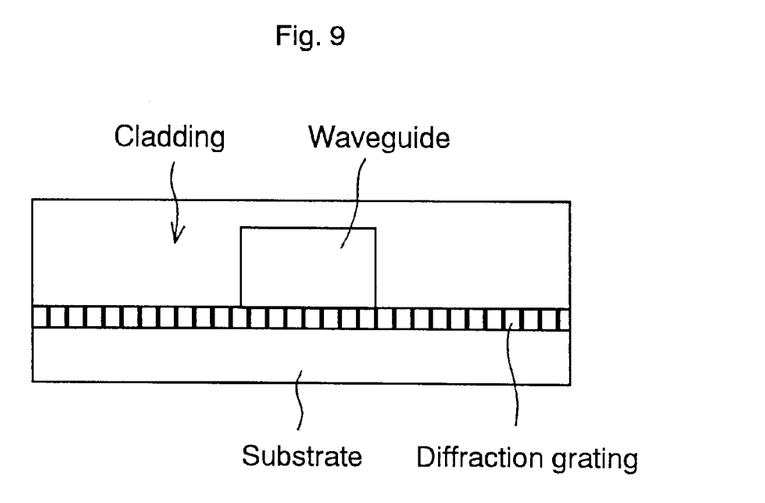
FIG. 9 shows a sectional configuration disposing a diffraction grating under a rectangular waveguide.

The configuration of the waveguide 34 and the location relation of the waveguide 34 and diffraction grating 32 are not limited to the example shown in FIG. 1. FIGS. 6, 7, 8 and 9 show modified examples of the configurations of respective waveguides and the location of the waveguide in relation to the diffraction grating. All of FIGS. 6 through 9 show configurations of the cross sections orthogonal to the direction of light. FIG. 6 shows a configuration in which the diffraction grating is disposed under a ridge waveguide. FIG. 7 shows a configuration in which the diffraction grating is disposed under a rib waveguide. FIG. 8 shows a configuration in which the diffraction grating is formed on a rib waveguide. FIG. 9 shows a configuration in which the diffraction grating is disposed under a rectangle waveguide.

As stated above, the waveguide 34 can be either an imbedded type or a rib type. Also, the shape of the cross section can be either circular (for example, an optical fiber) or rectangular. The composition of the waveguide 34 is not limited to semiconductors.

Figure 10:
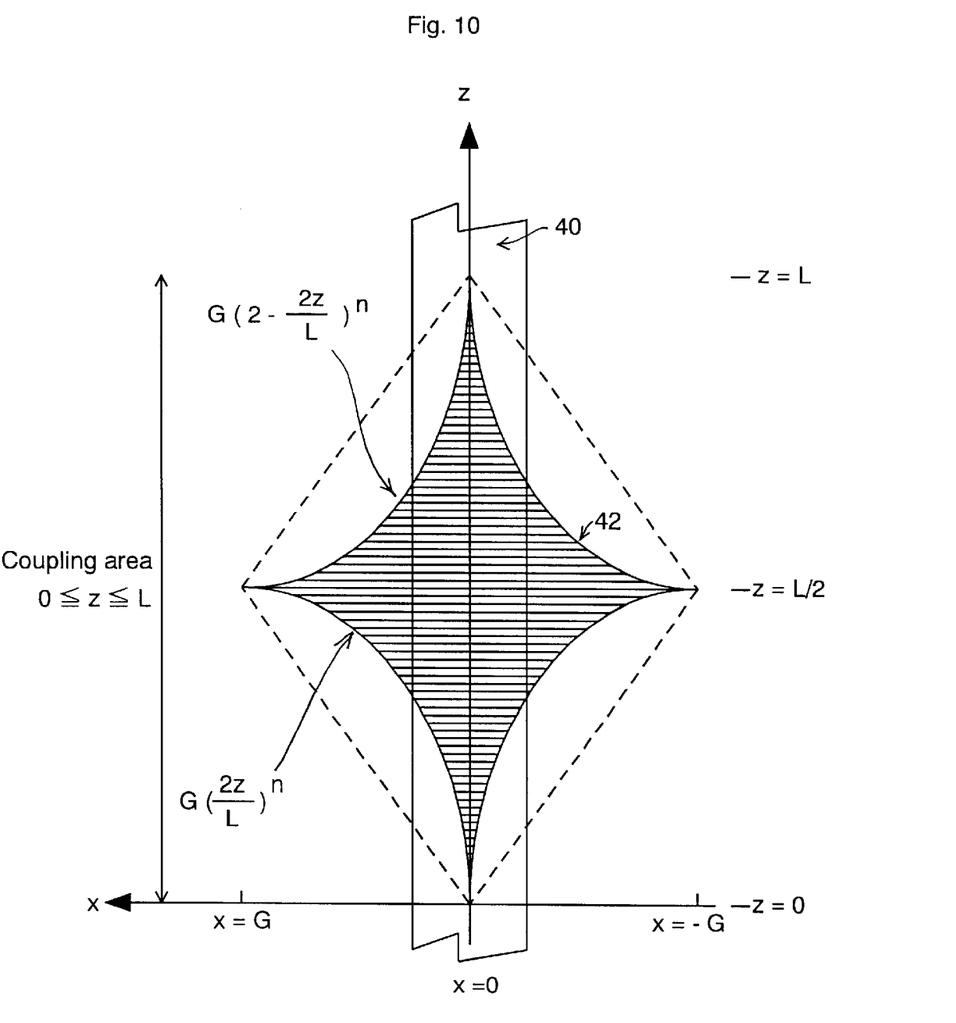
FIG. 10 shows a plan view of a modified embodiment according to the invention.

In the embodiment shown in FIG. 1, the diffraction grating 32 is disposed as if it slowly gets on the waveguide 34 from one side of the waveguide 34. However, if the diffraction grating 32 has a configuration to extend from the center toward both sides of the waveguide 34, the similar functional effect can be obtained. A plan view of the modified embodiment is shown in FIG. 10. An incurved rhomboid diffraction grating 42 is disposed adjacently on a waveguide 40. Due to the incurved shape of the diffraction grating 42, the coupling width of the diffraction grating 42 with the waveguide 40 becomes wider at the central part and becomes narrower more rapidly than linearly as approaching to both ends in the coupling area along to the light propagation direction z.

z represents the light propagation direction propagating on the waveguide 40 and x represents the direction of width of the waveguide 40 orthogonal to the light propagation direction. The shape of the diffraction grating 42 is symmetrical centering on the z-axis and the shapes of its ends are expressed as follows;

$$f(z)=G\times(2z/L)^n \text{ when } 0 \leq z \leq L/2,$$

and $$f(z)=G\times(2-2z/L)^n \text{ when } L/2 \leq z \leq L,$$

where n is lager than 1 similarly to the embodiment shown in FIG. 1.

The embodiment shown in FIG. 1 is easier to produce compared to the embodiment shown in FIG. 10. In the embodiment shown in FIG. 10, as the coupling width of the diffraction grating with the waveguide varies in the two sides, the variation of each side can be reduced relatively into half, contributing to the improvement of the wavelength selectivity and the easiness of production.

It is obvious that the wavelength filter of the embodiment is applicable to optical signal processing as well as optical transmission systems such as a long distance optical fiber communication, optical subscriber system communication, optical LAN and optical CATV.

As readily understandable from the foregoing description, according to the invention, unnecessary wavelength components generated in wavelength bands except for a selected wavelength band can be effectively suppressed and therefore crosstalk can be sufficiently reduced.

While the invention has been described with reference to the specific embodiment, it will be apparent to those skilled in the art that various changes and modifications can be made to the specific embodiment without departing from the spirit and scope of the invention as defined in the claims.

What is claimed is:

1. A wavelength filter comprising:
    a waveguide; and
    a diffraction grating disposed adjacent to the waveguide, which coupling width in relation to the waveguide becomes wider at the center part and narrower at both ends in a predetermined coupling area of the waveguide along the light propagation direction,
    wherein the variation of the coupling width of the diffraction grating in the light propagation direction of the waveguide becomes greater at the center part and smaller as approaching to both ends of the coupling area along the light propagation direction.

2. The wavelength filter of claim 1 wherein the coupling width of the diffraction grating varies at the n (n>1) power of the distance of the light propagation direction and becomes the greatest at the central part of the coupling area.

3. The wavelength filter of claim 1 wherein the diffraction grating extends from one direction on the side of the waveguide to be superimposed onto the waveguide.

4. The wavelength filter of claim 1 wherein the diffraction grating is rhomboid with its sides incurved and at least two of its vertices are superimposed with the waveguide.

5. The wavelength filter of claim 1 further comprising a second waveguide disposed adjacent to the waveguide.

6. A wavelength filter comprising:
    a waveguide; and
    a diffraction grating disposed adjacent to the waveguide said diffraction grating having a coupling width measured across the light propagation path of the waveguide, said coupling width being wider at a center than at both ends of a predetermined coupling area that extends along the light propagation direction of the waveguide;
    wherein the variation of the coupling width of the diffraction grating in the light propagation direction of the waveguide is greater adjacent the center than adjacent both of the ends of the coupling area.

7. The wavelength filter of claim 6 wherein the coupling width of the diffraction grating varies as a function of n(n>1) power of the length of the coupling area measured along the light propagation direction, said coupling width being greatest at the center of the coupling area.

8. The wavelength filter of claim 6 wherein the diffraction grating extends in the light propagation direction from outside the waveguide into superimposition with waveguide.

9. The wavelength filter of claim 6 wherein the diffraction grating is rhomboid with its sides incurved and at least two of its vertices are superimposed with the waveguide.

10. The wavelength filter of claim 6 further comprising a second waveguide disposed adjacent to the waveguide.

* * * * *

UNITED STATES PATENT AND TRADEMARK OFFICE
CERTIFICATE OF CORRECTION

PATENT NO. : 6,327,404 B1
DATED : December 4, 2001
INVENTOR(S) : Masayoshi Horita et al.

It is certified that error appears in the above-identified patent and that said Letters Patent is hereby corrected as shown below:

<u>Title page,</u>
Item [57], ABSTRACT,
Line 2, replace "Assumed" with -- Assuming --
Line 10, replace that portion of the formula reading
"$f(Z)=g_{min}+(g_{max\text{-}gmin})$" with -- $f(Z)=g_{min}+(g_{max}-g_{min})$ --

Signed and Sealed this

Nineteenth Day of August, 2003

JAMES E. ROGAN
*Director of the United States Patent and Trademark Office*